United States Patent
Oyama et al.

(10) Patent No.: US 10,290,856 B2
(45) Date of Patent: May 14, 2019

(54) CATHODE MATERIAL AND LITHIUM ION BATTERY

(71) Applicant: SUMITOMO OSAKA CEMENT CO., LTD., Chiyoda-ku, Tokyo (JP)

(72) Inventors: Masataka Oyama, Tokyo (JP); Satoru Oshitari, Tokyo (JP); Ryuuta Yamaya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 253 days.

(21) Appl. No.: 14/665,513

(22) Filed: Mar. 23, 2015

(65) Prior Publication Data

US 2016/0111712 A1    Apr. 21, 2016

(30) Foreign Application Priority Data

Oct. 20, 2014  (JP) ................. 2014-213599

(51) Int. Cl.
*H01M 4/00*  (2006.01)
*H01M 4/136*  (2010.01)
(Continued)

(52) U.S. Cl.
CPC ......... *H01M 4/136* (2013.01); *H01M 4/5825* (2013.01); *H01M 4/625* (2013.01); *H01M 4/366* (2013.01); *H01M 4/623* (2013.01); *H01M 10/0525* (2013.01); *H01M 2004/028* (2013.01); *H01M 2220/10* (2013.01);
(Continued)

(58) Field of Classification Search
CPC ........... H01M 2004/028; H01M 4/136; H01M 4/5825; H01M 4/625; H01M 4/366; H01M 10/0525; H01M 2220/10; H01M 4/623; H01M 2220/20
See application file for complete search history.

(56) References Cited

U.S. PATENT DOCUMENTS

| | | | | |
|---|---|---|---|---|
| 2011/0065002 A1* | 3/2011 | Nagase | ................ | C01G 49/009 429/221 |
| 2012/0196185 A1* | 8/2012 | Kono | .................... | H01M 4/136 429/221 |
| 2015/0099175 A1* | 4/2015 | Kitagawa | .............. | H01M 4/625 429/220 |

FOREIGN PATENT DOCUMENTS

| JP | A-2009-004371 | 1/2009 |
|---|---|---|
| JP | A-2011-049161 | 3/2011 |

(Continued)

OTHER PUBLICATIONS

Zaghib et al., "New advanced cathode material: LiMnPO4 encapsulated with LiFePO4", Published Dec. 9, 2011, Journal of Power Source, pp. 177-181.*
(Continued)

*Primary Examiner* — Nicholas P D'Aniello
(74) *Attorney, Agent, or Firm* — Merchant & Gould P.C.

(57) ABSTRACT

A cathode material including an aggregate formed by aggregating active material particles, in which the active material particle is a particle including a cathode active material as a formation material and a carbonaceous material is provided on a surface of the particle, a ratio between a weight ratio of carbon contained in the aggregate to a BET specific surface area of the cathode material is in a range of 0.08 to 0.2, a tap density is in a range of 0.9 g/cm³ to 1.5 g/cm³, and an oil absorption amount for which N-methyl-2-pyrrolidone is used is 70 cc/100 g or less.

4 Claims, 2 Drawing Sheets

(51) Int. Cl.
  *H01M 4/58* (2010.01)
  *H01M 4/62* (2006.01)
  *H01M 4/02* (2006.01)
  *H01M 4/36* (2006.01)
  *H01M 10/0525* (2010.01)
(52) U.S. Cl.
  CPC ........ *H01M 2220/20* (2013.01); *Y02E 60/122* (2013.01); *Y02P 70/54* (2015.11)

(56) References Cited

FOREIGN PATENT DOCUMENTS

| JP | A-2012-104290 | 5/2012 |
| JP | A-2012-185979 | 9/2012 |
| JP | A-2013-069565 | 4/2013 |

OTHER PUBLICATIONS

Office Action for corresponding Japanese Patent Application No. 2014-213599 (dated Jan. 27, 2015).

* cited by examiner

CATHODE MATERIAL AND LITHIUM ION BATTERY

This application claims the benefit of priority to Japanese Patent Application No. 2014-213599 filed 20 Oct. 2014, the disclosure of which is hereby incorporated by reference in its entirety.

TECHNICAL FIELD

The present invention relates to a cathode material and a lithium ion battery.

BACKGROUND ART

Studies have been conducted regarding secondary batteries used in portable electronic devices and hybrid vehicles. As typical secondary batteries, lead storage batteries, alkali storage batteries, lithium ion batteries, and the like are known. Among a variety of secondary batteries, lithium secondary batteries in which a lithium ion battery is used have advantages of high output, high energy density, and the like.

As a cathode material used for lithium ion batteries, phosphate which includes Li and transition metals and has an olivine structure is known. For example, iron-based olivine-type compounds have excellent electrochemical characteristics and stability, and thus, currently, are employed for a variety of uses such as cathode materials for stationary or in-vehicle lithium ion batteries.

In recent years, there has been a demand for improving the performance of lithium ion batteries, and a variety of studies have been performed. For example, in a case in which a lithium ion battery is used in a high-current density region, additional improvement of electron conductivity is required for improving performance. In response to the requirements of the above-described properties, techniques of coating the surfaces of cathode active materials with a carbonaceous material (hereinafter, in some cases, simply referred to as carbon coating) are known (for example, refer to Patent Document 1 to 3). As a method for coating the surfaces of cathode materials with carbon, a method is known in which a carbon source and a cathode material are mixed together and the mixture is fired in an inert atmosphere or a reducing atmosphere.

CONVENTIONAL Art

Patent Document

Patent Document 1: Japanese Unexamined Patent Application, First Publication No. 2009-004371
Patent Document 2: Japanese Unexamined Patent Application No. 2011-049161
Patent Document 3: Japanese Unexamined Patent Application, First Publication No. 2012-104290

DISCLOSURE OF THE INVENTION

Problem to be Solved by the Invention

When it is necessary to increase the effect of the carbon coating, it is preferable that the coating ratio of the particle surface which is coated with a cathode material is high, and the carbonization degree of the carbonaceous material which coats the surfaces of the particles is high.

However, when the amount of a carbon source is increased in order to increase the carbon coating ratio, carbon having an insufficient degree of carbonization is likely to remain at places other than the particle surfaces of the cathode material, and there have been problems of a decrease in the powder density of the cathode material, the deterioration of rate characteristics, and the deterioration of handling properties during the production of cathodes. The conditions of the carbon coating (the coating ratio and the degree of carbonization of carbonaceous materials) are affected by a variety of properties such as the primary particle diameter and secondary particle diameter of cathode active materials, the particle shapes of cathode active materials, and the agglomeration states of secondary particles, and thus it has been difficult to stably provide cathode materials which are capable of producing high-performance lithium ion batteries.

The present invention has been made in consideration of the above-described circumstances, and an object of the present invention is to provide a cathode material capable of producing high-performance lithium ion batteries. In addition, another object of the present invention is to provide a lithium ion battery including the above-described cathode material.

Means for Solving the Problem

In order to solve the above-described problems, according to an aspect of the present invention, there is provided a cathode material including an aggregate formed by aggregating active material particles, in which the active material particle is a particle including a cathode active material as a formation material, and a carbonaceous material is provided on a surface of the particle, a ratio between a weight ratio of carbon contained in the aggregate to a BET specific surface area of the cathode material is in a range of 0.08 to 0.2, a tap density is in a range of 0.9 g/cm$^3$ to 1.5 g/cm$^3$, and an oil absorption amount for which N-methyl-2-pyrrolidone is used is 70 cc/100 g or less.

According to the aspect of the present invention, the active material particle may include a central particle formed of the cathode active material and a coating layer which is formed on a surface of the central particle and is formed of the carbonaceous material, and the central particle may include a first layer including $Li_xA_yD_zPO_4$ (here, A represents one or more metal elements selected from a group consisting of Co, Mn, Ni, Fe, Cu, and Cr, D represents one or more elements selected from a group consisting of Mg, Ca, Sr, Ba, Ti, Zn, B, Al, Ga, In, Si, Ge, Sc, Y, and rare earth elements, $0.8<x<1.5$, $0<y<1$, and $0≤z<1.5$) and a second layer which coats the first layer and includes a compound including either or both Fe and Ni.

According to the aspect of the present invention, the second layer may be $Li_wE_bGO_4$ (here, E represents either or both Fe and Ni, G represents one or more elements selected from a group consisting of P, Si, and S, $0<w≤2$, and $0<b≤1.5$).

According to the aspect of the present invention, the active material particle may include a central particle formed of the cathode active material and a coating layer which is formed on a surface of the central particle and includes the carbonaceous material, the central particle may include $Li_xA_yD_zPO_4$ (here, A represents one or more selected from a group consisting of Co, Mn, Ni, Fe, Cu, and Cr, D represents one or more selected from a group consisting of Mg, Ca, Sr, Ba, Ti, Zn, B, Al, Ga, In, Si, Ge, Sc, Y, and rare earth elements, $0.8<x<1.5$, $0<y<1$, and $0≤z<1.5$), and the coating layer may include a complex including a compound including either or both Fe and Ni and the carbonaceous material.

According to the aspect of the present invention, the compound may be $Li_wE_bGO_4$ (here, E represents either or both Fe and Ni, G represents one or more elements selected from a group consisting of P, Si, and S, $0<w\leq2$, and $0<b\leq1.5$).

According to the aspect of the present invention, A may be Fe.

According to another aspect of the present invention, there is provided a lithium ion battery including the cathode material.

Effects of the Invention

According to the present invention, it is possible to provide a cathode material capable of producing a high-performance lithium ion battery. In addition, it is possible to provide a high-performance lithium ion battery including the above-described cathode material.

BEST MODE FOR CARRYING OUT THE INVENTION

Cathode Material

Figure 1:
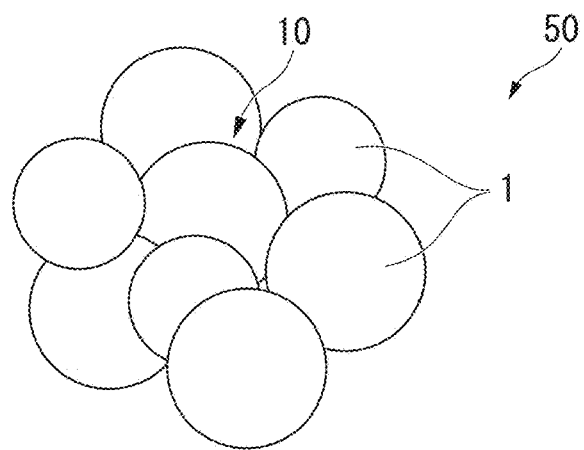
FIG. 1 is a schematic view illustrating a cathode material of the present embodiment.

FIG. 1 is a schematic view illustrating a cathode material of a first embodiment of the present invention.

A cathode material 50 of the present embodiment includes an aggregate 10 formed by aggregating active material particles 1, in which the active material particle 1A is a particle including a cathode active material as a formation material and has a carbonaceous material on the surface of the particle, the ratio between the weight ratio of carbon contained in the aggregate 10 and the BET specific surface area (the weight ratio of carbon contained in the aggregate/BET specific surface area) is in a range of 0.08 to 0.2, the tap density is in a range of 0.9 $g/cm^3$ to 1.5 $g/cm^3$, and the oil absorption amount for which N-methyl-2-pyrrolidone is used is 70 cc/100 g or less.

Figure 2:
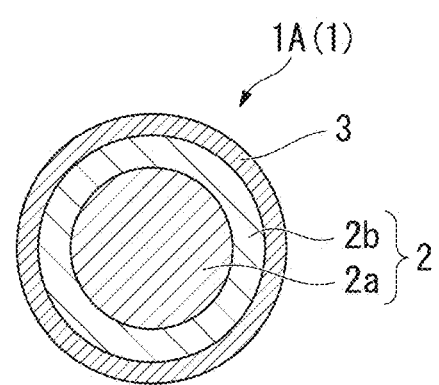
FIG. 2 is a schematic view illustrating an example of an active material particle.

FIG. 2 is a schematic view illustrating the active material particle 1A that is an example of the active material particle 1 included in the cathode material of a second embodiment of the present invention.

The active material particle 1A includes a central particle 2 formed of a cathode active material and a coating layer 3 which is formed on the surface of the central particle 2 and is formed of a carbonaceous material.

The central particle 2 includes a first layer 2a and a second layer 2b that coats the first layer 2a.

The first layer 2a includes $Li_xA_yD_zPO_4$ (here, A represents one or more metal elements selected from a group consisting of Co, Mn, Ni, Fe, Cu, and Cr, D represents one or more elements selected from a group consisting of Mg, Ca, Sr, Ba, Ti, Zn, B, Al, Ga, In, Si, Ge, Sc, Y, and rare earth elements, $0.8<x<1.5$, $0<y<1$, and $0\leq z<1.5$).

The second layer 2b includes $Li_wE_bGO_4$ (here, E represents either or both Fe and Ni, G represents one or more elements selected from a group consisting of P, Si, and S, $0<w\leq2$, and $0<b\leq1.5$).

The rare earth elements refer to 15 elements of La, Ce, Pr, Nd, Pm, Sm, Eu, Gd, Tb, Dy, Ho, Er, Tm, Yb, and Lu which belong to the lanthanum series.

Figure 3:
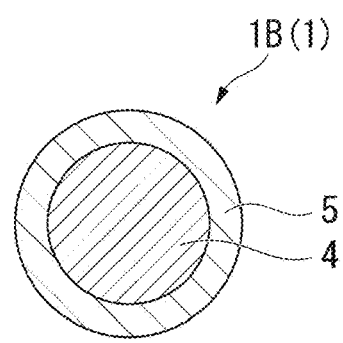
FIG. 3 is a schematic view illustrating an example of an active material particle.

As the active material particle, it is also possible to employ another form. FIG. 3 is a schematic view illustrating an active material particle 1B that is an example of the active material particle 1 included in a cathode material of a third embodiment of the present invention.

The active material particle 1B includes a central particle 4 formed of a cathode active material and a coating layer 5 which is formed on the surface of the central particle 4 and is formed of a carbonaceous material.

The central particle 4 includes $Li_xA_yD_zPO_4$ (here, A represents one or more selected from a group consisting of Co, Mn, Ni, Fe, Cu, and Cr, D represents one or more selected from a group consisting of Mg, Ca, Sr, Ba, Ti, Zn, B, Al, Ga, In, Si, Ge, Sc, Y, and rare earth elements, $0.8<x<1.5$, $0<y<1$, and $0\leq z<1.5$).

The coating layer 5 includes a complex of $Li_wE_bGO_4$ (here, E represents either or both Fe and Ni, G represents one or more elements selected from a group consisting of P, Si, and S, $0<w\leq2$, and $0<b\leq1.5$) and a carbonaceous material.

Here, A is preferably Co, Mn, Ni, or Fe, and more preferably Fe. D is preferably Mg, Ca, Sr, Ba, Ti, Zn, or Al. In a case in which the cathode active material includes the above-described elements, it is possible to produce cathode materials capable of realizing a high discharge potential and a high level of safety. In addition, the above-described elements have abundant resources, and thus are preferred as selective materials.

The average particle diameters of the central particles 2 and 4 are preferably in a range of 5 nm to 500 nm, and more preferably in a range of 20 nm to 200 nm.

When the average particle diameter is 5 nm or more, there is no concern of the breakage of crystal structures due to a volume change caused by charging and discharging, which is preferable. In addition, when the average particle diameter is 500 nm or less, the amount of electrons supplied to the inside of the particles does not easily become insufficient, and the usage efficiency does not easily degrade, which is preferable.

The thicknesses of the coating layers 3 and 5 are preferably in a range of 0.1 nm to 25 nm, and more preferably in a range of 1 nm to 5 nm.

When the thickness of the coating layer is 0.1 nm or more, the electron conductivity becomes sufficient, and consequently, the supply amount of electrons is not insufficient. In addition, when the thickness is 25 nm or less, the ratio of the carbonaceous material accounting for the entire cathode material does not become excessive, and it becomes easy to effectively use the active material.

The average particle diameter of the aggregate 10 is preferably in a range of 0.5 µm to 100 µm, more preferably in a range of 1 µm to 50 µm, and still more preferably in a range of 5 µm to 30 µm.

When the average particle diameter of the aggregate 10 is 0.5 µm or more, the aggregate does not easily fly during working, and it becomes easy to handle the aggregate. On the other hand, when the average particle diameter is 100 µm or less, the possibility of the presence of the aggregate larger than the film thickness of the dried electrode is decreased when a battery electrode is produced using the aggregate, and it becomes easy to uniformly hold the film thickness of the electrode (it becomes easy to decrease the film thickness difference).

With respect to the active material particles 1 included in the aggregate 10, in order to uniformly cause a reaction of the intercalation and deintercalation of lithium ions throughout the entire surfaces of the active material particles when the active material particles are used as an electrode material for lithium ion batteries, it is preferable to coat 80% or more and preferably 90% or more of the surfaces of the active material particles 1 with the coating layer.

The coating ratio of the active material particle 1A coated by the coating layer 3 or the coating ratio of the active material particle 1B coated by the coating layer 5 can be measured using a transmission electron microscope (TEM) or an energy-dispersive X-ray spectroscope (EDX). In places on which the coating layer is not formed, the resistance caused by the reaction of the intercalation and deintercalation of lithium ions becomes high, and the voltage significantly drops at the final stage of discharge. However, when the coating ratio provided by the coating layer is 80% or more, the coating effect of the coating layer becomes sufficient, charges easily migrate along the interfaces between the active material particles and an electrolytic solution, and the above-described voltage drop is suppressed, which is preferable.

The volume density of the cathode material 50 can be measured using a mercury porosimeter. The volume density is computed from the total mass of the cathode material 50 and the volume of gaps between the particles constituting the cathode material 50.

The volume density of the cathode material 50 is preferably in a range of 50% by volume to 80% by volume, more preferably in a range of 55% by volume to 75% by volume, and still more preferably in a range of 60% by volume to 75% by volume of the volume density.

When the volume density of the cathode material 50 is 50% by volume or more, in voids inside the aggregate 10, the vapor concentration of an organic compound that is a raw material of the carbonaceous material does not become too low, and the thickness of the coating layer formed inside the aggregate 10 does not easily become thin. Therefore, it is possible to suppress the internal resistance of the cathode material 50 at a low level, which is preferable.

On the other hand, when the volume density of the cathode material 50 is 80% by volume or less, channel-shaped (net-shaped) micropores formed in the aggregate 10 do not easily become small, and consequently, tarry substances generated during the carbonization of the organic compound are not easily trapped inside the aggregate 10, which is preferable.

The "internal resistance" mentioned herein refers to the sum of, mainly, electron resistance and lithium ion migration resistance. In the active material particles, the internal resistance increases at places in which no coating layer is generated, or at places in which the reaction resistance regarding the intercalation and deintercalation of lithium ions is high due to a thin thickness of the coating layer which is formed on the surfaces. Specifically, the internal resistance appears in a form of the degree of voltage drop at the final stage of discharge when the active material particles are used as the cathode active material for lithium ion batteries.

That is, in the active material particles in which the intercalation and deintercalation reaction of lithium ions is uniformly caused throughout the entire surfaces thereof, the voltage drops slightly at the final stage of discharge. On the other hand, in the active material particles which have parts of the surfaces wherein a reaction resistance regarding the intercalation and deintercalation of lithium ions is high, the voltage drops significantly at the final stage of discharge.

When the volume density of the aggregate 10 is set in a range of 50% by volume to 80% by volume, and the aggregate 10 is densified in a state of having a certain amount of micropores (voids), the strength of the entire aggregate 10 increases. Therefore, the aggregate 10 does not easily break, for example, when an electrode slurry is prepared by mixing the cathode material 50 with a binder, a conductive auxiliary agent and a solvent. As a result, an increase in the viscosity of the prepared electrode slurry is suppressed, and the fluidity is maintained, and thus the coatability becomes favorable, and it is also possible to improve the filling property of the cathode active material in the coated film obtained from the electrode slurry.

When the volume density of the aggregate 10 is 50% by volume or more, the outer peripheral portion of the aggregate 10 is densified, and thus the strength of the aggregate 10 increases. Therefore, when a cathode is formed using the cathode material 50, it is possible to prevent crushing of the aggregate 10 when bonding is performed by pressurization-cathodecathode, voids can be maintained inside the cathode, and the liquid-holding property of the electrolytic solution can be improved. As a result, according to the cathode material 50 of the present embodiment, it is possible to obtain secondary batteries having excellent input and output characteristics.

The pore size distribution of the micropores included in the aggregate 10 can be measured using a mercury porosimeter. The pore size distribution preferably has a single peak form.

When the pore size distribution has a single peak form, that is, the normal distribution, the amount of coarse voids inside the aggregate decreases, and the volume density of the aggregate becomes uniform. Therefore, the amount of a carbon compound derived from the organic compound which is gasified from the inside of the aggregate becomes uniform. Thus, unevenness of the carried amount of the coating layer which is provided at the surfaces of the cathode active material in the aggregate becomes small, and such a structure is preferable.

The micropore diameter (D50) at which the cumulative volume percentage reaches 50% from the small micropore diameter side in the pore size distribution, that is, the average micropore diameter is preferably 0.3 µm or less, and more preferably in a range of 0.1 µm to 0.25 µm.

When the average micropore diameter is 0.3 µm or less, the volume density of the aggregate relatively reaches 50% by volume or more. Therefore, when the electrode slurry is produced using the aggregate, a binder and a solvent, the binder does not easily enter into the inside of the aggregate, consequently, a decrease in the amount of the binder that links the aggregates together is suppressed, and the strength of an electrode film formed using the electrode slurry can be maintained.

In the pore size distribution, furthermore, the micropore diameter (D90) at which the cumulative volume percentage reaches 90% from the small micropore diameter side is preferably 1.0 µm or less, and more preferably 0.5 µm or less.

When the micropore diameter (D90) is 1.0 µm or less in the micropore diameter distribution, the micropore diameter distribution does not excessively spread in the radial direction, and the single peak form of the pore size distribution can be maintained. In addition, coarse voids are not formed inside the aggregate, and the volume density of the aggregate easily becomes uniform. As a result, the amount of the carbon compound gasified from the inside of the aggregate 10 becomes uniform, and thus variation of the amount of the coating layer provided at the surfaces of the cathode active material included in the aggregate 10 becomes small.

In the aggregate 10, the ratio of "the average film thickness of the coating layer provided at the inner peripheral portion" to "the average film thickness of the coating layer provided at the outer peripheral portion" (the thickness of the coating layer provided at the inner peripheral portion/the thickness of the coating layer provided at the outer peripheral portion) is preferably in a range of 0.7 to 2.0.

Here, when the ratio of "the average film thickness of the coating layer provided at the inner peripheral portion" to "the average film thickness of the coating layer provided at the outer peripheral portion" (the thickness of the coating layer provided at the inner peripheral portion/the thickness of the coating layer provided at the outer peripheral portion) is outside the above-described range, the thickness of the coating layer provided at the outer peripheral portion or the inner peripheral portion of the aggregate becomes thin, the electric resistance of the coating layer becomes high at specific positions of the aggregate, which causes uneven electron conductivity, and the internal resistance of the aggregate becomes high, which is not preferable.

"The thickness of the coating layer provided at the inner peripheral portion/the thickness of the coating layer provided at the outer peripheral portion" of the aggregate can be computed in the following manner. The coating layer of the aggregate is observed using a transmission electron microscope (TEM). The average value of the thicknesses of the coating layers of 100 different particles in the center portion of the aggregate, that is, the inner peripheral portion is measured, and the average value of the thicknesses of the coating layers of 100 different particles in the outer peripheral portion is measured, and then "the thickness of the coating layer provided at the inner peripheral portion/the thickness of the coating layer provided at the outer peripheral portion" can be computed using the above-described measurement values.

The cathode material 50 of the present embodiment satisfies the following three requirements. It was found through studies that cathode materials satisfying the three requirements have appropriate carbon coating states (the coating ratio and the degree of carbonization of the carbonaceous material) in spite of the influence of a variety of properties such as the primary particle diameter and secondary particle diameter of the cathode active materials, the particle shapes of the cathode active materials, and the agglomeration states of secondary particles. Therefore, the handling properties thereof during the production of cathodes are favorable, and it is possible to facilitate the production of lithium ion batteries since high-performance thereof can be expected without actually forming and measuring lithium ion batteries.

(i) The ratio between the weight ratio of carbon contained in the aggregate 10 and the BET specific surface area of the cathode material 50 is in a range of 0.08 to 0.2.

(ii) The tap density is in a range of 0.9 g/cm$^3$ to 1.5 g/cm$^3$.

(iii) The oil absorption amount for which N-methyl-2-pyrrolidone (NMP) is used is 70 cc/100 g or less.

First, regarding the requirement (i), when the ratio between the weight ratio of carbon contained in the aggregate 10 to the BET specific surface area of the cathode material 50 is 0.08 or more, the conductive path between the active material particles by the carbon coating layer is sufficiently maintained, and an improvement in rate characteristics is anticipated.

In addition, when the ratio between the weight ratio of carbon contained in the aggregate 10 to the BET specific surface area of the cathode material 50 exceeds 0.2, the thickness of the carbon coating layer becomes too thick, and thus the migration of lithium ions in the carbon coating layer is hindered, and the rate characteristics degrade.

The ratio of the weight ratio of carbon contained in the aggregate 10 to the BET specific surface area of the cathode material 50 is preferably in a range of 0.1 to 0.17.

Next, regarding the requirement (ii), when the tap density of the cathode material 50 is 0.9 g/cm$^3$ or more, the electrode density easily increases during the production of electrodes, and thus the volume energy density improves.

In addition, when the tap density of the cathode material 50 exceeds 1.5 g/cm$^3$, some positions are generated where the number of gaps between primary particles is small and the electrolytic solution does not easily enter into the aggregate, the interfaces between the active material and the electrolytic solution decreases, and accordingly, the rate characteristics deteriorate.

The tap density of the cathode material 50 is preferably in a range of 1.1 g/cm$^3$ to 1.4 g/cm$^3$.

Next, regarding the requirement (iii), when the NMP oil absorption amount of the cathode material 50 is 70 cc/100 g or less, during the production of electrodes, it is possible to reduce the amount of the binder and/or NMP, and thus handling properties such as coatability and productivity during the production of electrodes improve. In addition, the active material does not easily peel off from a collector, and the peeling strength improves.

In a case in which the cathode material 50 of the present embodiment is evaluated, a method is used in which the internal resistance of the cathode material is measured using a 2032 coin cell having an electrode film thickness of 60 μm by a current rest method is used. The internal resistance obtained in the above-described manner is preferably 20Ω or less.

When the internal resistance is 20Ω or less, the necessity of thinning the electrode film thickness in order to reduce the internal resistance of batteries is lessened. Therefore, a decrease in the battery capacity per electrode can be suppressed, and it becomes possible to produce batteries having a desired battery capacity with a small number of electrodes.

According to the cathode material of the present embodiment as described above, a high-performance cathode material is produced.

Method for Producing the Cathode Material

The cathode material of a first embodiment of the present invention can be produced by mixing a cathode active material or a precursor of the cathode active material, an organic compound and a solvent so as to produce a slurry, spraying and drying the slurry, and firing the obtained dried substance in a non-oxidative atmosphere.

In addition, a cathode material of a second aspect of the present invention can be produced by (i) mixing a cathode active material including $Li_wA_xDO_4$ particles (here, A represents one or more metal elements selected from the group consisting of Co, Mn, Ni, Fe, Cu and Cr, D represents one or more elements selected from the group consisting of Mg, Ca, Sr, Ba, Ti, Zn, B, Al, Ga, In, Si, Ge, Sc, Y and rare earth elements, 0.8<x<1.5, 0<y<1, and 0≤z<1.5) or a precursor of the material and a solution including a compound including either or both Fe and Ni so as to produce a slurry, (ii) spraying and drying the slurry, and firing the obtained dried substance in a non-oxidative atmosphere, thereby forming central particles having $Li_wA_xDO_4$ particles and a carbonization catalyst layer, then, (iii) mixing the central particles, an organic compound and a solvent so as to produce a slurry, and (iv) spraying and drying the slurry, and firing the obtained dried substance in a non-oxidative atmosphere.

Furthermore, a cathode material of a third aspect of the present invention can be produced by (i) mixing a cathode active material including $Li_wA_xDO_4$ particles or a precursor of the material and a solution including a compound including either or both Fe and Ni and an organic compound that serves as a carbon source so as to produce a slurry, and (ii) spraying and drying the slurry, and firing the obtained dried substance in a non-oxidative atmosphere.

Preparation of a Cathode Active Material or a Precursor of the Cathode Active Material First, a cathode active material or a precursor of the cathode active material is prepared. As the cathode active material, it is possible to use the above-described substances. In addition, cathode active materials produced using a well-known method such as a solid-phase method, a liquid-phase method or a gas-phase method can be used.

The cathode active material may be crystalline particles, amorphous particles or mixed crystal particles in which crystalline particles and amorphous particles coexist. Even when the cathode active material is amorphous particles, the cathode active material crystallizes when being thermally treated in a non-oxidative atmosphere at 500° C. to 1000° C.

$Li_wA_xDO_4$ particles can be preferably used as the cathode active material, wherein the particles are obtained by preparing a dispersion liquid by dispersing a lithium salt, a metal salt containing A, a metal salt containing D or a compound containing D, and a phosphoric acid compound in a dispersion medium, subsequently, putting the prepared dispersion liquid into a pressure resistant vessel, heating the dispersion liquid at a predetermined temperature, reacting the dispersion liquid for a predetermined time (hydrothermal reaction), and then firing the obtained reaction productcathode.

Examples of the lithium salt include lithium acetate ($LiCH_3COO$), lithium chloride (LiCl), lithium hydroxide (LiOH) and the like.

As the metal salt containing A, it is possible to use a divalent halide, sulfate, nitrate, acetate or the like.

As the metal salt containing D, it is possible to use a halide, sulfate, nitrate, acetate or the like.

As the compound containing D, it is possible to use $MgCl_2$, $MgSO_4$, $AlCl_3$, $Al(CH_3CO_2)_3$ or the like.

Examples of the phosphoric acid compound include phosphoric acid ($H_3PO_4$), ammonium dihydrogen phosphate ($NH_4H_2PO_4$), diammonium hydrogen phosphate (($NH_4)_2HPO_4$) and the like.

Each component may be singly used, or two or more thereof may be jointly used as the component. Particularly, as the cathode active material, central particles having carbonization catalyst layers which is formed from a compound including either or both Fe and Ni on the surfaces of the $Li_wA_xDO_4$ particles are preferably used.

When the carbonization catalyst layer is provided, the surfaces of the cathode active material particles are uniformly coated with a carbonaceous film, and thus the improvement of the powder density or the reduction of the oil absorption amount can be achieved, and therefore it becomes easy to adjust the tap density of the present invention in a range of 0.9 g/cm³ to 1.5 g/cm³ and the oil absorption amount for which N-methyl-2-pyrrolidone is used to 70 cc/100 g or less.

When a cathode active material including $Li_wA_xDO_4$ particles or a precursor of the material and a solution including a compound including either or both Fe and Ni are mixed together so as to produce a slurry, the slurry is sprayed and dried, and the obtained dried substance is fired in a non-oxidative atmosphere, it is possible to form central particles having a carbonization catalyst layer on the surfaces of $Li_wA_xDO_4$ particles.

As the compound including either or both Fe and Ni, it is possible to use the following compounds.

Examples of the compound including Fe include FeO, $FeCl_2$, $FeSO_4$, $Fe(CH_3COO)_2$ and the like.

Examples of the compound including Ni include NiO, $NiCl_2$, $NiSO_4$, $Ni(CH_3COO)_2$ and the like.

The compound may be singly used, or a mixture of two or more compounds may be used.

It is also preferable that central particles having a carbonization catalyst layer which is $Li_wE_bGO_4$ (here, E represents either or both Fe and Ni, G represents one or more elements selected from the group consisting of P, Si and S, $0<w\leq2$, and $0<b\leq1.5$) are used.

The use of the $Li_wE_bGO_4$ layer as the carbonization catalyst layer is more preferable since $Li_wE_bGO_4$ also has the effect of a cathode active material.

When a cathode active material including $Li_wA_xDO_4$ particles or a precursor of the material, said central particles in which a Li source, an E source and a G source are included at a molar ratio (Li source/E source/G source) of w:b:1, $0<w\leq2$, and $0<b\leq1.5$, an organic compound and a solvent are mixed together so as to produce a slurry, the slurry is sprayed and dried, and the obtained dried substance is fired in a non-oxidative atmosphere, it is possible to form central particles having a carbonization catalyst layer which is $Li_wE_bGO_4$ (here, E represents either or both Fe and Ni, G represents one or more elements selected from the group consisting of P, Si and S, $0<w\leq2$, and $0<b\leq1.5$) on the surfaces of $Li_wA_xDO_4$ particles.

As the Li source, for example, one or more selected from the group of lithium inorganic acid salts such as LiOH, $Li_2CO_3$, LiCl, and $Li_3PO_4$, lithium organic acid salts such as $LiCH_3COO$ and $(COOLi)_2$, and hydrates thereof are preferably used.

As the E source, a compound including either or both selected from the group of Fe and Ni, for example, one or more selected from the group of $FeCl_2$, $FeSO_4$, $Fe(CH_3COO)_2$, $NiCl_2$, $NiSO_4$, $Ni(CH_3COO)_2$ and hydrates thereof are preferably used.

As the G source, one or more selected from the group of phosphoric acids such as $H_3PO_4$ and $HPO_3$, phosphoric acid sources such as $NH_4H_2PO_4$, $(NH_4)_2HPO_4$, $(NH_4)_3PO_4$ and hydrates thereof, Si sources such as $SiO_2$ and $Si(OCH_3)_4$, and S sources such as $(NH_4)_2SO_4$ and $H_2SO_4$ are preferably used.

As the dispersion medium, it is possible to use, for example, water, a polar organic solvent such as alcohols, ethers, acetonitrile, or tetrahydrofuran and dimethyl sulfoxide, a solution mixture including water and/or the polar organic solvent, liquefied gas or the like. While there is no particular limitation, water is preferably used since the environmental load is small, and water is cheap and safe. In addition, since water shows a large change in permittivity near the critical point, it is possible to easily control solvent properties such as solubility of individual substances by adjusting temperature and pressure, and the reaction conditions are also easily controlled.

The conditions of a hydrothermal reaction are appropriately selected depending on the kind of the solvent and substance being synthesized. In a case in which the solvent is a substance other than water, the heating temperature is preferably in a range of 80° C. to 900° C., and the reaction time is preferably in a range of 0.5 hours to 24 hours. When the reaction is caused in a sealed pressure resistant vessel, the pressure during the reaction falls in a range of 0.1 MPa to 100 MPa. In a case in which the solvent is water, the heating temperature is preferably in a range of 80° C. to 374° C., and the pressure during the reaction falls in a range of 0.1 MPa to 22 MPa. The heating temperature is more preferably in a range of 100° C. to 350° C., the reaction time is more preferably in a range of 0.5 hours to 5 hours, and the pressure during the reaction falls in a range of 0.1 MPa to 17 MPa.

The size of the particle of the cathode material (central particle) is not particularly limited, but the average particle diameter of the central particles is preferably in a range of 5 nm to 500 nm, and more preferably in a range of 20 nm to 200 nm.

When the average particle diameter is 5 nm or more, there is no concern of the breakage of crystal structures due to a volume change caused by charging and discharging, which is preferable. In addition, when the average particle diameter is 500 nm or less, the amount of electrons supplied to the inside of the particles does not easily become insufficient, and the usage efficiency does not easily degrade, which is preferable.

The particle shape of the cathode active material is not particularly limited. The particle shape of the cathode active material is often formed depending on the production method, and for example, spherical particles are likely to be obtained when the cathode active material is produced using a solid-phase method, and rectangular particles or rod-like particles are likely to be obtained when the cathode active material is produced using a hydrothermal synthesis method. Individual particles have their own good characteristics as follow: spherical particles have an excellent filling property, rectangular particles have an excellent lithium ion intercalation and deintercalation reactivity, and rod-like particles allow easy contact between the particles and thus have excellent electron conductivity. Therefore, the spherical particles, the rectangular particles, and the rod-like particles may be singly used, or a mixture of two or more kinds of the particles may be used.

Spraying and Drying of the Slurry

Next, the above-described particles of the cathode active material, an organic compound and the solvent are mixed together so as to prepare a slurry.

Particularly, it is preferably to mix the above-described cathode active material particles, the compound including either or both Fe and Ni which serves as a carbonization catalyst, an organic compound and the solvent so as to prepare a slurry.

When fired in a non-oxidative atmosphere, the compound including either or both Fe and Ni acts as the carbonization catalyst, and the surfaces of the cathode active material particles are uniformly coated with the carbonaceous film, and thus the improvement of the powder density or the reduction of the oil absorption amount can be achieved. Therefore it becomes easy to adjust the tap density of the present invention in a range of 0.9 g/cm³ to 1.5 g/cm³ and the oil absorption amount for which N-methyl-2-pyrrolidone is used to 70 cc/100 g or less.

Furthermore, it is preferable to prepare a slurry by mixing the above-described particles of the cathode active material, the Li source, the E source, and the G source which are capable of forming $Li_wE_bGO_4$ (here, E represents either or both Fe and Ni, G represents one or more elements selected from a group consisting of P, Si and S, $0<w\leq2$, and $0<b\leq1.5$), the organic compound and the solvent.

When the Li source, the E source and the G source which are capable of forming $Li_wE_bGO_4$ are included, $Li_wE_bGO_4$ has not only the effect of the carbonization catalyst layer but also the effect of the cathode active material, which is more preferable.

Examples of the organic compound include vinyls such as polyvinyl alcohol, polyvinyl pyrrolidone and polyvinyl acetate; celluloses such as cellulose, carboxymethyl cellulose, methyl cellulose, hydroxylmethyl cellulose and hydroxyethyl cellulose; sugars such as glucose, fructose, galactose, mannose, maltose, sucrose and lactose; starch, gelatin, polyacrylic acid, polystyrene sulfonate, polyacrylamide, glycogen, pectin, alginic acid, glucomannan, chitin, hyaluronic acid, chondroitin, agarose, polyether, divalent alcohols such as ethylene glycol, trivalent alcohols such as glycerin, and the like.

Regarding the mixing ratio between the cathode active material and the organic compound, when the total amount of the organic compound is converted to the amount of carbon, the amount of the organic compound is preferably in a range of 0.6 parts by mass to 10 parts by mass, and more preferably in a range of 0.8 parts by mass to 4.0 parts by mass with respect to 100 parts by mass of the cathode active material.

When the mixing ratio of the organic compound which is converted into the carbon amount is 0.6 parts by mass or more, the coating ratio of the carbonaceous film does not easily drop below 80%. Therefore, in a case in which a battery is formed using the cathode material obtained from the prepared slurry, the discharge capacity at a high charge-discharge rate does not easily decreases, and it becomes possible to realize sufficient charge and discharge rate performance, which is preferable.

On the other hand, when the mixing ratio of the organic compound which is converted into the amount of carbon is 10 parts by mass or less, in a case in which a battery is formed using the cathode material obtained from the prepared slurry, the ratio of the coating layer does not become excessively high, and the amount of the cathode active material can be ensured, and thus it is possible to suppress a decrease in the battery capacity. In addition, it is possible to suppress a decrease in the electrode density and suppress a decrease in the battery capacity of a lithium ion battery per unit volume.

During the preparation of the slurry, a dispersant may be added as necessary.

The solvent is most suitably water in terms of easy procurement, easy handling, and low production costs. In addition, a liquid mixture of water and a solvent having a different boiling point from water may be used.

As the solvent having a different boiling point from water, it is possible to use one or a mixture of two or more selected from the group of monovalent alcohols such as methanol (boiling point: 64.1° C./at 1 atmosphere), ethanol (boiling point: 78.3° C./at 1 atmosphere) and 2-propanol (boiling point: 82.4° C./at 1 atmosphere); divalent alcohols such as ethylene glycol (boiling point: 197° C./at 1 atmosphere); trivalent alcohols such as glycerin (boiling point: 290° C./at 1 atmosphere), sugar alcohols, phenols, cycloparaffin-based hydrocarbons (cycloalkane), cycloolefin-based hydrocarbons (cycloalkene), cycloacetylene-based hydrocarbons (cycloalkyne), benzene-based aromatic compounds, condensed-ring aromatic compounds, benzo condensed-ring compounds, heteroaromatic compounds and non-benzene-based aromatic compounds.

The method for dissolving or dispersing the cathode active material and the organic compound in the solvent is not particularly limited as long as the cathode active material is dispersed, and the organic compound is dissolved or dispersed. It is preferable to use, for example, a medium stirring-type dispersion apparatus that stirs medium particles at a high speed such as a planetary ball mill, an oscillation ball mill, a bead mill, a paint shaker or an attritor.

During the dissolution or dispersion, it is preferable to disperse the cathode active material in a primary particle form, and then add and stir the organic compound so as to be dissolved. Then, the surfaces of the primary particles of the cathode active material are coated with the organic compound, and consequently, carbon derived from the organic compound is uniformly interposed between the primary particles of the cathode active material.

In the preparation of the slurry, regarding the cumulative volume percentage in the particle size distribution of the cathode active material or the precursor in the slurry, conditions are preferably controlled so that the ratio (D90/D10) of the particle diameter at 90% (D90) to the particle diameter at 10% (D10) falls in a range of 5 to 30. The dispersion conditions of the slurry can be adjusted using, for example, the respective concentrations of the cathode active material or the precursor thereof and the organic compound in the slurry, the stirring speed, the stirring time, and the like. Then, the particle size distribution of the cathode active material or the precursor thereof in the slurry becomes wide, and thus the cathode active material is closely packed in an aggregate obtained by spraying and drying the slurry, and it is possible to realized a volume density of the aggregate in a range of 50% by volume to 80% by volume.

Next, the slurry is generally sprayed and dried in a high-temperature atmosphere in which the atmospheric temperature is equal to or higher than the boiling point of the solvent, for example, in the atmosphere at a temperature in a range of 70° C. to 250° C.

When the spraying conditions, for example, the respective concentrations of the cathode active material or the precursor thereof and the organic compound in the slurry, the spraying pressure, and the spraying speed, and furthermore the drying conditions after the spraying, for example, the temperature increase rate, the peak holding temperature, the holding time, and the like are appropriately adjusted, a dried substance having an average particle diameter in a range of 0.5 µm to 100 µm and preferably in a range of 0.5 µm to 20 µm is obtained.

The atmosphere temperature during the spraying and the drying is affected by the evaporation speed of the solvent in the slurry, and thus the structure of the obtained dried substance can be controlled.

For example, as the atmospheric temperature becomes closer to the boiling point of the solvent in the slurry, a longer period of time is taken to dry the sprayed liquid droplets, and thus the obtained dried substance sufficiently contracts during a period of time necessary for the liquid droplets to be dried. Therefore, the dried substance sprayed and dried at an atmospheric temperature close to the boiling point of the solvent in the slurry does not easily have a hollow structure.

On the other hand, when the slurry is sprayed and dried at an atmospheric temperature significantly higher than the boiling point of the solvent in the slurry, the sprayed liquid droplets are dried in a moment, and thus the fluidity of the slurry significantly degrades. Therefore, the obtained dried substance is dried in a moment, and thus a sufficient amount of time for the dried substance to contract is not provided. Therefore, the dried substance sprayed and dried at an atmospheric temperature higher than the boiling point of the solvent in the slurry easily generates a hollow structure. Furthermore, it is possible to obtain a single-peak pore size distribution of micropores present in the aggregate, and it is possible to set the average micropore diameter of the aggregate to 0.3 µm or less.

Firing

Next, the dried substance is fired in a non-oxidative atmosphere at a temperature in a range of 500° C. to 1000° C., preferably in a range of 600° C. to 900° C., for 0.1 hours to 40 hours.

The non-oxidative atmosphere is preferably an inert atmosphere of nitrogen ($N_2$), argon (Ar) or the like, and in a case in which it is necessary to further suppress oxidization, a reducing atmosphere including approximately several % by volume of a reducing gas such as hydrogen ($H_2$) is preferred. In addition, in order to remove organic components evaporated in the non-oxidative atmosphere during the firing, it is also possible to introduce combustion-enhancing or burnable gases such as oxygen ($O_2$) into the inert gas atmosphere.

When the firing temperature is 500° C. or higher, the organic compound contained in the dried substance is sufficiently decomposed and reacted, and thus the organic compound is sufficiently carbonized, and consequently, the high-resistance decomposed substance of the organic compound does not easily remain in the obtained aggregate, which is preferable.

On the other hand, when the firing temperature is 1000° C. or lower, Li in the cathode active material does not easily evaporate, and thus the composition of the cathode active material does not easily deviate, and grains of the cathode active material do not easily grow. As a result, the discharge capacity at a high charge-discharge rate does not easily decrease, and sufficient charge and discharge rate performance can be realized, which are preferable.

Through the above-described steps, an aggregate (the cathode active material) made of secondary particles having carbon interposed between the primary particles of the electrode active material since the surfaces of the primary particles of the electrode active material are coated with carbon generated by the thermal decomposition of the organic compound in the dried substance is obtained.

Lithium Ion Battery

Figure 4A:
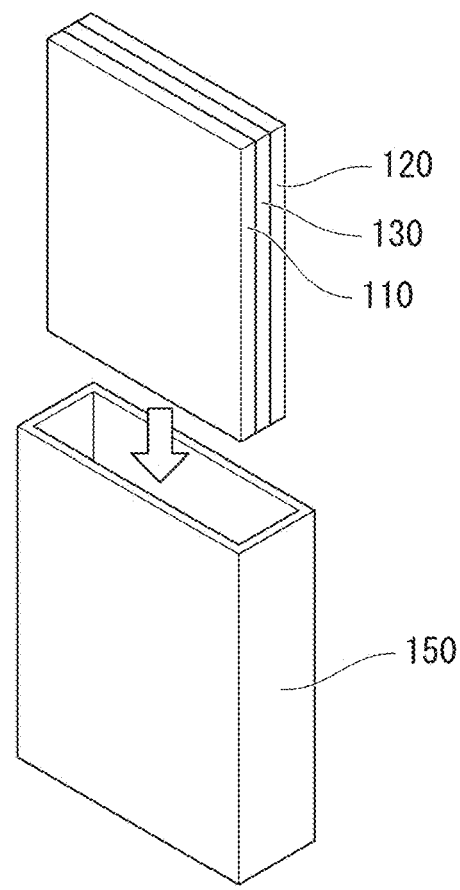
FIGS. 4A and 4B are a schematic view illustrating an example of a lithium ion battery according to the present embodiment.
Figure 4B:
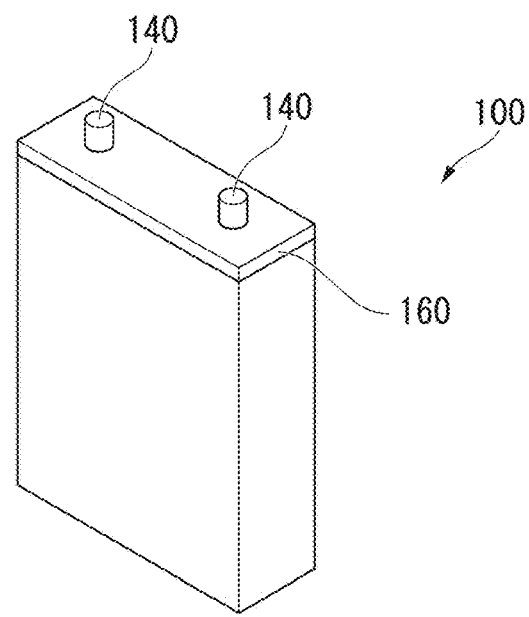

FIGS. 4A and 4B are a schematic view illustrating an example of a lithium ion battery according to the present embodiment. The drawing illustrates a square lithium ion battery 100. The lithium ion battery 100 includes a cathode 110, a negative electrode 120, a separator 130, terminals 140, a housing 150 and a lid 160. The lithium ion battery 100 has a so-called laminated constitution.

The cathode 110 includes the above-described cathode material or a cathode material produced using the above-described method for producing the cathode material. The drawing illustrates members having a square shape when seen in a planar view.

In order to produce the cathode 110, coating material for forming the cathode or paste for forming the cathode is prepared by mixing the above-described cathode material or a cathode material produced using the above-described method for producing a cathode material, a binder made of a binder resin and a solvent. At this time, a conductive auxiliary agent such as carbon black may be added as necessary.

As the binder, that is, the binder resin, for example, a polytetrafluoroethylene (PTFE) resin, a polyvinylidene fluoride (PVdF) resin, fluororubber or the like is preferably used.

The blending ratio between the cathode material and the binder resin is not particularly limited, and for example, the amount of the binder resin is set in a range of 1 part by mass to 30 parts by mass, and preferably in a range of 3 parts by mass to 20 parts by mass with respect to 100 parts by mass of the cathode material.

Examples of the solvent used in the coating material for forming the cathode or the paste for forming the cathode include water; alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetylacetone and cyclohexanone; amides such as dimethyl formamide, N,N-dimethyl acetamide and N-methyl pyrrolidone; glycols such as ethylene glycol, diethylene glycol and propylene glycol; and the like. These solvents may be singly used, or a mixture of two or more solvents may be used.

Next, the coating material for forming the cathode or the paste for forming the cathode is applied to one surface of a metal foil, and then is dried, thereby obtaining a metal foil having a coating made of a mixture of the cathode material and the binder resin formed on one surface of the metal foil.

Next, the coating is bonded to the metal foil by pressurization, and is dried, thereby producing a collector (cathode) having a cathode material layer on one surface of the metal foil.

Therefore, the cathode 110 can be produced.

The negative electrode 120 is illustrated in the drawing as a member having a square shape when seen in a planar view. As the negative electrode 120, it is possible to use a negative electrode that is generally known to be used as a negative electrode for lithium ion batteries. For example, it is possible to use a negative electrode produced using a negative electrode material such as metallic Li, a carbon material, a Li alloy or $Li_4Ti_5O_{12}$.

The separator 130 has functions of preventing the short circuit between the cathode 110 and the negative electrode 120 and holding an electrolytic solution by impregnation. As the separator 130, it is possible to use a separator that is generally known to be used as a separator for lithium ion batteries.

In the lithium ion battery 100, the terminals 140 are respectively connected to the cathode 110 and the negative electrode 120, and electrically connect the electrodes to an external device.

The housing 150 accommodates the cathode 110, the negative electrode 120, the separator 130 and the electrolytic solution, and is capable of employing a variety of shapes on the basis of the standards of batteries, for example, a cylindrical shape, in addition to the square shape illustrated in the drawing.

The lid 160 seals the housing 150, and has the terminals 140 attached thereto.

The above-described lithium ion battery 100 can be produced by, first, providing the separator 130 between the cathode 110 and the negative electrode 120, accommodating the components in the housing 150 (FIG. 4A), impregnating the separator 130 with the electrolytic solution so as to dispose an electrolyte between the cathode 110 and the negative electrode 120, and sealing the housing 150 using the lid 160 having the terminals 140 respectively connected to the cathode 110 and the negative electrode 120 (FIG. 4B).

In the figure, a set of the cathode 110, the negative electrode 120 and the separator 130 is accommodated in the housing 150, but it is also possible to alternatively dispose a plurality of cathodes and a plurality of anode, and dispose separators between each combination of the respective cathodes and the respective anode, thereby forming a multilayer laminated constitution.

In addition, instead of the electrolytic solution and the separator 130, a solid electrolyte may be used.

According to the lithium ion battery having the above-described constitution, since the cathode material of the present embodiment is included, high-performance lithium ion batteries are obtained.

Thus far, the preferred embodiments according to the present invention have been described with reference to the accompanying drawings, and it is needless to say that the present invention is not limited to the examples. The shapes, combinations and the like of the respective components described in the aforementioned examples are examples, and a variety of modifications based on design requirements and the like are allowed within the scope of the purpose of the present invention.

EXAMPLES

Hereinafter, the present invention will be described using examples, but the present invention is not limited to the examples.

Example 1

After 4.00 mol of lithium acetate ($LiCH_3COO$), 1.6 mol of manganese (II) sulfate ($MnSO_4$), 0.4 mol of iron (II) sulfate ($FeSO_4$), and 2 mol of phosphoric acid ($H_3PO_4$) were mixed with 2 L (liters) of water, water was further added so that the total amount reached 4 L, thereby preparing a homogeneous slurry-form mixture.

Next, the mixture was provided in a pressure resistant vessel having a capacity of 8 L, and was hydrothermally synthesized at 120° C. for 1 hour. The obtained sediment was washed using water, thereby obtaining a cake-like olivine-type phosphoric acid compound.

Subsequently, 150 g (in terms of the solid content) of the olivine-type phosphoric acid compound, 20 g (13.3% by mass) of polyvinyl alcohol as the organic compound, and an aqueous solution obtained by dissolving 7.5 g (5% by mass), in terms of the solid content of $LiFePO_4$, of a carbonization catalyst consisting of a Li source ($LiCH_3COO$), a Fe source ($FeSO_4$) and a $PO_4$ source ($H_3PO_4$) in 200 g of water, were added into a ball mill, furthermore, 500 g of zirconia balls having a diameter of 5 mm were added as medium particles, and a dispersion treatment was carried out.

Next, the obtained slurry was sprayed in the atmosphere at 180° C., and was dried, thereby obtaining a dried substance having an average particle diameter of 6 μm. The average particle diameter was measured using a particle size distribution measurement instrument (SALD-2000J, manufactured by Shimadzu Corporation, refractive index parameter: 1.70-0.02i).

Subsequently, the obtained dried substance was fired in a nitrogen atmosphere at 700° C. for 0.5 hours, thereby obtaining a cathode material of Example 1.

Evaluation of Cathode Materials

The obtained cathode materials were evaluated using the following methods.

(1) Weight Ratio of Carbon Contained

The weight ratio of carbon contained was measured using a carbon/sulfur analyzer (manufactured by Horiba, Ltd., EMIA-220V).

(2) BET Specific Surface Area

The BET specific surface area was measured using a measurement instrument (manufactured by Mountech Co., Ltd., HM model-1208) and a one-point method at a relative pressure of 0.29 (P/P0).

(3) Tap Density

The tap density was measured using a powder tester (manufactured by Hosokawa Micron Corporation, PT-E).

(4) Oil Absorption Amount for which N-Methyl-2-Pyrrolidone (NMP) is Used

The oil absorption amount for which N-methyl-2-pyrrolidone (NMP) is used was measured using linseed oil instead of NMP according to JIS K5101-13-1 (Refined linseed oil method).

Production of Cathode

The obtained cathode material, polyvinylidene fluoride (PVdF) as a binder and acetylene black (AB) as a conductive auxiliary agent were mixed together so that the mass ratio thereof was 90:5:5, and furthermore, N-methyl-2-pyrrolidone (NMP) was added as a solvent so as to impart fluidity, thereby producing a slurry.

Next, the slurry was applied on a 15 μm-thick aluminum (Al) foil, and was dried. After that, the aluminum foil was pressurized at a pressure of 600 kgf/cm², and a cathode was produced.

Evaluation of Cathode (5) Cathode Density

A cathode sheet pressurized at a pressure of 600 kgf/cm² was punched to φ15.9 mm using a coin-type punch, thereby producing a cathode.

The thicknesses of the obtained cathode were measured at 5 points, a value obtained by subtracting the thickness of a collector from the average value of the five thicknesses was considered as the thickness of the cathode, and the volume of the cathode was computed. Similarly, the mass of the cathode was computed from the difference in mass between the electrode and the collector, and the cathode density was obtained by dividing the mass of the cathode by the volume of the cathode.

(6) Evaluation of Handling Properties

The handling properties were evaluated using the viscosity of the cathode slurry, the coatability and productivity during the production of the cathode. Cathode materials having favorable handling properties were shown by "○", and cathode materials having poor handling properties were shown by "×".

Production of Lithium Ion Batteries

Lithium metal was provided as a negative electrode against the cathode of the lithium ion battery, and a separator made of porous polypropylene was provided between the cathode and the negative electrode, thereby producing a battery member.

Meanwhile, ethylene carbonate and diethyl carbonate were mixed together in (a mass ratio of) 1:1, and furthermore, 1 M of a $LiPF_6$ solution was added, thereby producing an electrolyte solution having lithium ion conductivity.

Next, the battery member was immersed in the electrolyte solution, thereby producing the lithium ion battery of Example 1.

Evaluation of Lithium Ion Batteries (7) 3 C Discharge Capacity

First, the lithium ion battery was constant-current-charged at a 0.1 C rate up to 4.3 V in a 25° C. constant-temperature bath, and then was constant-voltage-charged until the current value of a 0.01 C rate was reached. After that, the capacity when the lithium ion battery was constant-current-discharged at a 3 C rate to 2.0 V in a 25° C. constant-temperature bath was considered as the 3 C discharge capacity.

Example 2

A cathode material, a cathode, and a lithium ion battery of Example 2 were obtained in the same manner as in Example 1 except that 3 g (2% by mass), in terms of the solid content of $LiFePO_4$, of the carbonization catalyst consisting of the Li source ($LiCH_3COO$), the Fe source ($FeSO_4$) and the $PO_4$ source ($H_3PO_4$) was used.

Comparative Example 1

A cathode material, a cathode and a lithium ion battery of Comparative Example 1 were obtained in the same manner as in Example 1 except that the amount of the polyvinyl alcohol added was set to 9 g (6% by mass), and the carbonization catalyst was not added (0% by mass).

Comparative Example 2

A cathode material, a cathode and a lithium ion battery of Comparative Example 2 were obtained in the same manner as in Example 1 except that $LiFePO_4$ which was the carbonization catalyst was not added (0% by mass).

Comparative Example 3

A cathode material, a cathode and a lithium ion battery of Comparative Example 3 were obtained in the same manner as in Example 1 except that 1.5 g (1% by mass), in terms of the solid content of $LiFePO_4$, of the carbonization catalyst consisting of the Li source ($LiCH_3COO$), the Fe source ($FeSO_4$) and the $PO_4$ source ($H_3PO_4$) was used.

The evaluation results are described in Tables 1 and 2 described below. In the evaluation, the lithium ion batteries were determined to be favorable or poor on the basis of the 3 C discharge capacity and the handling properties.

TABLE 1

|  | Amount of PVA added (% by mass) | Amount of carbonization catalyst added (% by mass) | Carbon amount (% by mass) | BET value (m²/g) | Ratio of carbon amount to BET | Tap density (g/cc) | NMP oil absorption amount (cc/100 g) |
|---|---|---|---|---|---|---|---|
| Example 1 | 13.3 | 5 | 2.08 | 12.95 | 0.161 | 1.22 | 48.3 |
| Example 2 | 13.3 | 2 | 1.57 | 13.28 | 0.118 | 1.08 | 51.2 |
| Comparative Example 1 | 6 | 0 | 0.65 | 11.21 | 0.058 | 1.11 | 47.5 |
| Comparative Example 2 | 13.3 | 0 | 1.28 | 13.38 | 0.096 | 0.81 | 76.2 |
| Comparative Example 3 | 13.3 | 1 | 1.42 | 13.31 | 0.107 | 0.87 | 72.3 |

TABLE 2

|  | Cathode density (g/cm³) | 3 C discharge capacity (mAh/g) | Handling properties |
|---|---|---|---|
| Example 1 | 1.8 | 129 | ○ |
| Example 2 | 1.6 | 111 | ○ |
| Comparative Example 1 | 1.7 | 107 | ○ |
| Comparative Example 2 | 1.4 | 121 | x |
| Comparative Example 3 | 1.5 | 109 | x |

As a result of the evaluation, it was found that the present invention is useful.

In this way, due to the present invention, high-performance cathode material can be provided. In addition, a cathode including the cathode material and a lithium ion battery including the cathode can be provided.

DESCRIPTION OF REFERENCE NUMERALS AND SIGNS 1, 1A, 1B: ACTIVE MATERIAL PARTICLE
2,4: CENTRAL PARTICLE
2a: FIRST LAYER
2b: SECOND LAYER
3, 5: COATING LAYER
10: AGGREGATE
50: CATHODE MATERIAL
100: LITHIUM ION BATTERY
100: PARTICLE
110: CATHODE
120: NEGATIVE ELECTRODE
130: SEPARATOR
140: TERMINAL
150: HOUSING
160: LID

The invention claimed is:

1. A cathode material comprising an aggregate formed by aggregating active material particles,
wherein the active material particle is a particle including a cathode active material as a formation material, and a carbonaceous material is provided on a surface of the particle,
the amount of the carbonaceous material is in a range of 0.6 to 2.08% by mass with respect to 100 parts by mass of the cathode active material,
a ratio between a mass ratio (% by mass) of carbon contained in the aggregate to a BET specific surface area (m²/g) of the cathode material is in a range of 0.08 to 0.2,
a tap density is in a range of 0.9 g/m³ to 1.5 g/cm³,
an oil absorption amount for which N-methyl-2-pyrrolidone is used is 70 cc/100 g or less,
the active material particle includes
a central particle formed of the cathode active material and a coating layer which is formed on a surface of the central particles and is formed of the carbonaceous material,
wherein the central particle includes
a first layer including $Li_xA_yD_zPO_4$ wherein A represents two or more metal elements selected from a group consisting of Co, Mn, Ni, Fe, Cu, and Cr, D represents one or more elements selected from a group consisting of Mg, Ca, Sr, Ba, Ti, Zn, B, Al, Ga, In, Si, Ge, Sc, Y and rare earth elements, $0.8<x<1.5$, $0<y\le1$ and $0\le z<1.5$), and
a second layer which coats the first layer and includes $LiFePO_4$ as carbonization catalyst.

2. A lithium ion battery comprising the cathode material according to claim 1.

3. The cathode material according to claim 1 wherein the central particle is formed of $LiFe_{0.2}Mn_{0.8}PO_4$.

4. The cathode material according to claim 1, wherein the oil absorption amount for which N-methyl-2-pyrrolidone is used is 48.3 to 70 cc/100 g.

* * * * *